United States Patent [19]

Fallmann et al.

[11] Patent Number: 5,225,527
[45] Date of Patent: Jul. 6, 1993

[54] MODIFIED COLOPHONY RESINS, A PROCESS FOR THEIR PREPARATION, THEIR USE AND PAPER-SIZING AGENTS CONTAINING COLOPHONY RESINS OF THIS TYPE

[75] Inventors: Johannes Fallmann, Krems; Wolfgang Streicher, Vienna; Helmut Ronge, Krems, all of Austria

[73] Assignee: Krems Chemie Aktiengesellschaft, Krems, Austria

[21] Appl. No.: 521,492

[22] Filed: May 10, 1990

[30] Foreign Application Priority Data

Jun. 8, 1989 [AT] Austria ................. 1417/89

[51] Int. Cl.$^5$ ............................................. D06P 1/46
[52] U.S. Cl. ......................... 530/210; 130/214; 130/218; 428/497
[58] Field of Search ............ 530/210, 214, 218; 525/133, 152; 503/211

[56] References Cited

U.S. PATENT DOCUMENTS 4,540,635 9/1985 Ronge et al. ................. 530/260

Primary Examiner—John Kight, III
Assistant Examiner—Duc Truong
Attorney, Agent, or Firm—Sprung Horn Kramer & Woods

[57] ABSTRACT

Modified colophony resins are strengthened with $\alpha,\beta$-unsaturated carbonyl compounds and simultaneously converted into the corresponding intermolecular resin acid anhydrides with dehydrating agents. Paper-sizing agents which are superior to those of the prior art can be prepared from these.

8 Claims, No Drawings

MODIFIED COLOPHONY RESINS, A PROCESS FOR THEIR PREPARATION, THEIR USE AND PAPER-SIZING AGENTS CONTAINING COLOPHONY RESINS OF THIS TYPE

The present invention relates to colophony resins modified in a special way, which are strengthened with α,β-unsaturated carbonyl compounds and converted into the corresponding intermolecular resin acid anhydrides by dehydrating agents, to a process for the preparation of specially modified colophony resins of this type, to their use as paper-sizing agents and to paper-sizing agents in the form of aqueous dispersions which contain specially modified colophony resins of this type.

The use of aqueous dispersions containing colophony resins for sizing papers has been known for a long time and is described, for example, in Casey; Pulp and Paper, 2nd edition, Volume II: Papermaking, pages 1043 to 1066, Interscience Publishers, New York, 1961. The colophony resins, for example wood rosin, balsamic resin, tall resin and the like are in this case customarily strengthened, i.e. reacted with α,β-unsaturated carbonyl compounds or formaldehyde, before they are processed to give dispersions. This strengthening is intended to increase the productivity of the sizing agents and, in the case of formaldehyde, to prevent a possible tendency to crystallize. The reaction of the colophony resins with α,β-unsaturated carbonyl compounds, for example with acrylic acid, fumaric acid, maleic acid or their accessible anhydrides, is based on formation of a Diels-Alder adduct with resin acids of suitable structure contained in the colophony resin, for example with levopimaric acid.

All paper sizes known hitherto, which contain resins strengthened in the manner mentioned, are used in the acid range in the industrial production of paper, in general at pH values below 6. At higher pH values, for example even at pH values between 6 and 7, considerable problems occur, above all if it is wished to use chalk as an economical filler or chalk-containing coating plant waste. Considerable differences in quality in the length of paper can thus occur which are due to variable amounts of chalk-containing waste which go back to different additions of aluminium sulphates which, for their part, are necessary to keep the pH constant. Reduced risk of corrosion and the saving of milling energy, as in the alkaline pH range, do not yet come completely to fruition in the pH interval between 6 and 7.

The procedure in the more strongly acid range is in general associated with considerable disadvantages in the presence of chalk. As a result of reaction of calcium carbonate with aluminium sulphate, sharp-edged gypsum crystals can be formed in this procedure which make the finished paper unusable as a result of doctor blade streaks or cuts and can damage the polished cylinders of the paper machine. Additionally, calcium carbonate can be converted into soluble calcium hydrogencarbonate in the acid range, which leads to an increase in the degree of hardness in the circulation water of the paper machine. In the acid range, therefore, only the relatively expensive kaolin, but not the more economical chalk or chalk-containing waste products from coating plants, can be used as a filler. However, the main disadvantage of sizing in the acid range is as, for example, J. Kaltenbach explains in "Die neuzeitliche Papierleimung" [Modern Paper Sizing], 2nd edition (1974), Verlag Dr. Martin Sändig GmbH, Walluf, page 219, the limited resistance to ageing of the sized paper, as acid residues lead to the paper yellowing and becoming brittle.

These disadvantages can be avoided by means of so-called neutral sizing, i.e. sizing in the pH range around or above 7, but then the major part of resin sizes known hitherto can no longer be employed. Predominantly synthetic sizing agents, for example dispersions which contain long-chain dimeric alkyl ketenes, have hitherto been employed for neutral sizing on the industrial scale.

As W. Kamutzki and Th. Krause note in "Wochenblatt für Papierfabrikationen" [Weekly Newspaper for Paper Manufacturing], Volume 7 (1983), pages 215 to 222, sizing agents of this type, however, have the serious disadvantage that they are not compatible with the aluminium sulphate which is employed for various purposes in paper mills. Additionally, partial sizings with sizing agents of this type can only be carried out with great difficulties.

Some examples of resin sizing in the quasi-neutral or alkaline range, for example at pH values of 6 to 9, have been disclosed, a sizing system of this type giving good results being mentioned first in an older patent application by the company (EP-OS [European Offenlegungsschrift]0,150,754). This paper-sizing agent is based on a modified colophony resin which is strengthened with formaldehyde and/or α,β-unsaturated carbonyl compounds and simultaneously esterified with 2.5 to 10% by weight of one or more amino alcohols, based on the starting resin. DE-PS 3,630,268 cites a similar principle using special emulsifier systems. The chemical basis is in both cases a reduction of the acid number of the previously modified sizing resin by esterification, preferably with amino alcohols. An analogous method is described in DE-PS 3,708,854, which is based on esterification with polyhydric alcohols, especially with glycerol.

U.S. Pat. No. 3,658,891 describes the preparation of maleopimaric acid, which is maleic anhydride reacted with a resin containing levopimaric acid. Reactions of this type are carried out in acetic acid which may contain water. Intermolecular resin acid anhydrides cannot be formed in this case, because dehydrating conditions (for example the presence of acetic anhydride) are not maintained.

U.S. Pat. No. 3,463,768 relates to the reaction of a resin with formaldehyde in the absence of an acid catalyst, followed by the addition of an acid dehydrating catalyst, for example sulphuric acid, phosphoric acid or p-toluenesulphonic acid. These catalysts cause the dehydration of methylol groups and do not lead to the formation of intermolecular resin acid anhydrides.

Modified colophony resins have now been found, which are characterized in that they are strengthened with α,β-unsaturated carbonyl compounds and additionally partially or completely dehydrated to give the corresponding intermolecular resin acid anhydrides. The latter is preferably carried out by reaction with acetic anhydride. The preparation of intermolecular resin acid anhydrides by treatment with acetic anhydride and their use in dispersion sizes has already been described in U.S. Pat. No. 3,582,464. However, this patent specification is limited explicitly to colophony resins (wood rosin, balsamic resin and tall resin in various purities), and to resins which are hydrogenated, polymerized or treated with formaldehyde. The use of adducts of the types of resin mentioned with α,β-unsaturated carbonyl compounds is not mentioned.

The essential feature of the present invention is that an intermolecular anhydride formation takes place in the colophony resin in addition to a strengthening with α,β-unsaturated carbonyl compounds. The formation of the Diels-Alder adduct may in this case be initiated before or after the dehydration step.

As can be seen from the examples, only the combination of both reaction steps leads to the best sizing results.

The modified colophony resins according to the invention may be derived from the customary colophony resins, for example from wood rosin, balsamic resin, tall resin or any mixtures of resins of this type. These colophony resins may also have been pretreated, for example they may have been subjected to a disproportionation or a treatment with formaldehyde. In addition, customary extenders, for example waxes and/or low-grade tall oil derivatives, can be admixed to the starting resins, up to about 10% by weight, based on the starting resin.

The strengthening with α,β-unsaturated carbonyl compounds may have been carried out in a customary manner, for example with fumaric acid, maleic acid, maleic anhydride or mixtures thereof. For example, from 3 to 12% by weight of α,β-unsaturated compounds, based on the starting resin, can be employed. Suitable reaction temperatures for the strengthening are, for example, those in the range from 170° to 250° C. If an additional treatment with formaldehyde is carried out, 0.5 to 2% by weight of formaldehyde, for example, based on the starting resin, are used.

The customary extenders previously mentioned may not only be added to the starting resin, but are also added at any point in time, for example after the strengthening and/or after the anhydride formation. The addition of extenders may also be omitted.

The preparation of the intermolecular anhydride can be carried out with dehydrating agents and is preferably carried out with acetic anhydride. The acetic acid formed in this case is expediently removed from the reaction mixture by distillation.

Acetic anhydride can be employed, for example, in an amount from 3 to 62% by weight, based on the starting resin. Preferably, this amount is 15 to 20% by weight; the resin acids are thus present partially or completely as intermolecular anhydrides.

Suitable reaction temperatures for the intermolecular anhydride formation are, for example, those in the range from 100° to 140° C, preferably in the range from 120° to 140° C. The dehydration is preferably carried out until the acid number of the reaction mixture remains constant after separating off the acetic acid.

The acetic acid formed can be separated off by distillation, which can be carried out under vacuum or at normal pressure. Blowing-in of nitrogen is advantageous in order to drive residual acetic acid completely out of the resin. The bottom temperatures may in this case be in the range from 200° to 250° C.

The present invention furthermore relates to the use of the specially modified colophony resins described above for the preparation of paper-sizing agents. The paper-sizing agents may in this case be prepared in a manner known per se, only with the difference that instead of the known resins, those described above which have been strengthened with α,β-unsaturated carbonyl compounds and additionally partially or completely converted into the corresponding intermolecular anhydrides with dehydrating agents are used.

The present invention furthermore relates to paper-sizing agents in the form of aqueous dispersions, which are characterized in that they contain the modified colophony resins described above as colophony resins which have been strengthened with α,β-unsaturated carbonyl compounds and additionally partially or completely converted into the corresponding intermolecular anhydrides with dehydrating agents.

The preparation of the paper-sizing agents according to the invention can be carried out in a manner known per se, for example by the so-called inversion process. In this, the resin is first converted into a water-in-oil emulsion at temperatures of, for example, 120° to 180° C. with vigorous stirring and with the addition of aqueous alkali, for example sodium hydroxide solution, potassium hydroxide solution and/or aqueous borax solution and/or emulsifiers, which is then inverted by addition of water, i.e. converted into an oil-in-water emulsion. In this case, too strong a thermal treatment of the resin in contact with water should be avoided, as otherwise hydrolysis of the intermolecular anhydride may even occur, as a result of which the effectiveness of sizing may decrease.

As an alternative process, dispersion after dissolving in a water-immiscible solvent and its subsequent separation by distillation can be used. A detailed description of emulsification methods and emulsifier systems which can be used is contained in U.S. Pat. No. 3,582,464.

The modified colophony resins according to the invention and paper-sizing agents containing these have a number of surprising advantages. They may be employed for sizings in the acid, neutral and alkaline range, for example in a pH range from 4 to 9, preferably 6 to 9, and particularly preferably from 6.5 to 8, and are distinguished in particular in the higher temperature range by good sizing results. The modified resins according to the invention may be used in the pulp both for complete and for partial sizings. They combine the advantages of resin sizes, for example their compatibility with aluminium sulphate, with the possibility of carrying out the sizing in the neutral to weakly alkaline range, in which it is possible to replace the expensive kaolin by cheaper chalk or chalk-containing waste from coating plants, and in which no gypsum formation from chalk and aluminium sulphate, and no formation of calcium hydrogencarbonate takes place and in particular the resistance to ageing of the paper is greatly increased by preventing it from yellowing and becoming brittle. Aluminium sulphate can be employed as the only precipitating agent for sizings in the pH range from 6 to 9 using the modified resins according to the invention. In addition, difficulties which occur, such as, for example, harmful resin, that is to say cellulose-related resin deposits on couch or drying cylinders—so-called shell substances—may be encountered as a result of sizing in the acid range and increasing the addition of aluminium sulphate.

The following examples illustrate the present invention without limiting it in any way.

EXAMPLES

Example 1

100 parts by weight of tall resin with an acid number of 170 were heated to 210° C. and 10 parts by weight of fumaric acid were added. The mixture was kept at this temperature for one hour and finally cooled to 140° C. After adding 32 parts by weight of acetic anhydride, the mixture was dehydrated at 140° C. for 5 hours and acetic acid formed was subsequently removed by distillation in a water jet vacuum. The resin modified in this way had an acid number of 82 and a softening point of 74° C.

Example 2

100 parts by weight of tall resin with an acid number of 170 were heated to 210° C. and 10 parts by weight of fumaric acid were added. The mixture was kept at this temperature for one hour and then cooled to 140° C. After adding 15.5 parts by weight of acetic anhydride, the mixture was dehydrated at 140° C. for 5 hours and acetic acid formed was then removed by distillation under normal pressure. In order to remove the last residues of acetic acid from the resin, it was flushed with nitrogen towards the end of the distillation. The resin modified in this way had an acid number of 147 and a softening point of 78° C.

Example 3

100 parts by weight of tall resin with an acid number of 170 were heated to 140° C. and dehydrated at this temperature for 5 hours with 32 parts by weight of acetic anhydride. After removing acetic acid formed by distillation in a water jet vacuum, a resin having an acid number of 51 and a softening point of 41° C. was obtained. This was heated to 210° C., 9.2 parts by weight of maleic anhydride were added and the mixture was kept at this temperature for one hour. The resin obtained had an acid number of 85 and a softening point of 69° C.

Example 4

100 parts by weight of tall resin with an acid number of 170 were heated to 210° C. and 8.5 parts by weight of maleic anhydride were added. The mixture was kept at this temperature for one hour and finally cooled to 140° C. After adding 15.5 parts by weight of acetic anhydride, the mixture was dehydrated at 140° C. for 5 hours and the acetic acid formed was then removed by distillation under normal pressure and with flushing with nitrogen. The resin modified in this way had an acid number of 93 and a softening point of 73° C.

Example 5

The procedure was as in Example 4, but 18.5 parts by weight of acetic anhydride were employed. The resin obtained had an acid number of 81 and a softening point of 76° C.

Example 6

The procedure was as in Example 4, but 23 parts by weight of acetic anhydride were employed. The modified resin had an acid number of 73 and a softening point of 66° C.

Example 7

The procedure was as in Example 4, but 32 parts by weight of acetic anhydride were employed. The resin modified in this way had an acid number of 60 and a softening point of 69° C.

Example 8

The procedure was as in Example 4, but 23 parts by weight of acetic anhydride were employed and the mixture was dehydrated at 140° C. for 2 hours. The resin obtained had an acid number of 67 and a softening point of 68° C.

Example 9

The procedure was as in Example 4, but 23 parts by weight of acetic anhydride were employed and the mixture was dehydrated at 140° C. for one hour. The resin obtained had an acid number of 75 and a softening point of 73° C.

Example 10

The procedure was as in Example 9, with the difference that balsamic resin with an acid number of 153 was employed instead of tall resin. After strengthening and dehydration, a resin having an acid number of 80 and a softening point of 98° C. was obtained.

Example 11

100 parts by weight of tall resin with an acid number of 170 were heated to 210° C. and 10 parts by weight of maleic anhydride were added. The mixture was kept at this temperature for one hour and finally cooled to 140° C. After adding 23 parts by weight of acetic anhydride, the mixture was dehydrated at 140° C. for one hour and acetic acid formed was then removed by distillation under normal pressure. In order to remove the last residues of acetic acid from the resin, it was flushed with nitrogen during the distillation. The resin modified in this way had an acid number of 88 and a softening point of 66° C.

Example 12

The procedure was as in Example 11, but 12 parts by weight of maleic anhydride were employed. The resin obtained had an acid number of 95 and a softening point of 69° C.

Example 13

The procedure was as in Example 11, but 12 parts by weight of maleic anhydride were employed and the mixture was dehydrated at 140° C. for 3 hours. The resin obtained had an acid number of 90 and a softening point of 78° C.

Example 14

The procedure was as in Example 11, but 14 parts by weight of maleic anhydride were employed. The resin obtained had an acid number of 101 and a softening point of 77° C.

Example 15

The procedure was as in Example 11, but 6 parts by weight of maleic anhydride were employed. The resin obtained had an acid number of 60 and a softening point of 61° C.

Example 16 (for comparison)

Resin according to U.S. Pat. No. 3,582,464

100 parts by weight of a tall resin with an acid number of 170 were dehydrated at 140° C. for 5 hours with 23 parts by weight of acetic anhydride. Acetic acid formed was then removed by distillation under normal pressure with nitrogen flushing. The resin modified in this way had an acid number of 22 and a softening point of 52° C.

Example 17

50 parts by weight of toluene were added at room temperature in each case to 100 parts by weight of the resins prepared according to Examples 1 to 16 and the resins were dissolved with stirring and gentle heating (max. 80° C). After adding 5 parts by weight of emulsifier (derivatives of phenol polyglycol ethers), pre-emulsions were prepared with 250 parts of water, in each case with vigorous stirring, and homogenized in a pressure disperser at 300 to 400 bar. Stable size dispersions with solids contents of 30% were obtained by azeotropic removal of water and toluene in vacuo.

Example 18

100 parts by weight of the resin prepared according to Example 6 were fused at 130° C. in a Bewoid mill and 8 parts by weight of emulsifier (derivatives of phenol polyglycol ethers) were added with vigorous stirring. The water-in-oil emulsion initially formed was finally inverted to an oil-in-water emulsion by metered addition of a total of 210 parts by weight of water. The aqueous dispersion thus obtained was stable and had a solids content of 30 to 31% by weight.

Example 19

In order to check the quality of the dispersions prepared according to Examples 17 and 18, circular paper test sheets of 20 cm diameter were prepared on a type G 8 E sheet formation unit from Gockel, Munich. The finishing of the test sheets was carried out at pH 7.3 using various amounts of size, calculated as solid resin, on atro paper using chalk as the filler. The cellulose employed consisted of a ratio of spruce:beech of 70:30 and had a degree of beating of 30° SR. The necessary amount of size and, if appropriate, a retention agent was added to a 0.25% strength by weight suspension of the cellulose in water with chalk as the filler. The addition of an aluminium sulphate solution in an amount of 1% by weight of aluminium sulphate solid to atro paper was then carried out in order to adjust the pH to 7.2 to 7.4. After filtering off the dilution water, the fibre web was predried at 70° C. to a moisture content of about 40% and then finish-dried on a drying cylinder at 115° C. The finished test sheets were subjected to a Cobb test 60. (TAPPI Method T44).

The results are assembled in Table 1.

TABLE 1

Water absorption ability in g per $m^2$ (Cobb value)
The dispersions prepared according to Example 17 and 18 were used for sizing.
Aluminium sulphate/paper: 1%
pH value: 7.3

| Dispersion according to Example 17 from resin according to Example | 0.8% size atro | | | 0.6% size atro | | | 0.4% size atro | | |
|---|---|---|---|---|---|---|---|---|---|
| | 20° C. | 45° C. | 50° C. | 20° C. | 45° C. | 50° C. | 20° C. | 45° C. | 50° C. |
| 1 | 19.2 | 22.9 | 24.3 | 25.6 | 22.5 | 29.6 | 57.4 | 52.8 | 54.4 |
| 2 | | | | 17.5 | 21.5 | 34.9 | — | — | 83.7 |
| 3 | 21.7 | 24 | | | | | | | |
| 4 | | | | 21.2 | 27.6 | | 27.0 | 29.2 | 41.7 |
| 5 | | | | 21.9 | 23.1 | 28.7 | 28.2 | 34.0 | 33.8 |
| 6 | | | | 19.8 | 21.8 | 23.1 | 25.7 | 26.2 | 27.8 |
| 7 | | | | 20.0 | 23.9 | 23.1 | 28.6 | 25.8 | 27.8 |
| 8 | | | | — | 21.6 | 22.8 | 23.9 | 25.4 | 26.5 |
| 9 | | | | 22.1 | 25.6 | 25.5 | 29.0 | 28.6 | 30.5 |
| 10 | | | | 24.8 | 28.2 | 35.5 | 31.1 | 39.6 | 46.8 |
| 11 | | | | 18.9 | 20.9 | 24.7 | 28.4 | 25.0 | 26.3 |
| 12 | | | | 20.5 | 21.8 | 22.8 | 23.5 | 25.7 | 25.8 |
| 13 | | | | 19.6 | 21.6 | 22.8 | 22.8 | 24.6 | 26.8 |
| 14 | | | | 19.3 | 22.5 | 21.9 | 24.2 | 23.5 | 28.2 |
| 15 | | | | 21.9 | 23.7 | 22.6 | 27.3 | 27.5 | 28.6 |
| 16 | 43.0 | 73.5 | — | | | | | | |
| Dispersion according to Ex. 18 from resin according to Ex. 6 | | | | 28.7 | 23.7 | | 49.1 | 32.0 | 36.6 |

The dispersion of the resin from Example 16 is not according to the invention.

What is claimed is:

1. A modified colophony resin, in which the colophony resin is strengthened with an α,β-unsaturated carbonyl compound and additionally dehydrated acetic anhydride to give the corresponding intermolecular resin acid anhydride.

2. The modified colophony resin of claim 1, in which the dehydration is made only partially.

3. A process for the preparation of a modified colophony resin, in which the colophony resin is strengthened with an α,β-unsaturated carbonyl compound and converted into the corresponding intermolecular anhydride with acetic anhydride in any sequence.

4. The process of claim 3, in which the dehydration is made only partially.

5. The process of claim 3, in which the modified colophony resin is derived from wood resin, balsamic resin, tall resin or mixtures thereof.

6. The process of claim 3, in which the colophony resin is strengthened with fumaric acid, maleic acid, maleic anhydride or mixtures thereof.

7. A method for the preparation of paper-sizing agents, in which there is used a colophony resin strengthened with an α,β-unsaturated carbonal compound and additionally converted into the corresponding intermolecular anhydride by acetic anhydride.

8. A paper-sizing agent in the form of an aqueous dispersion, which contains a modified colophony resin which has been strengthened with an α,β-unsaturated carbonyl compound and additionally converted into the corresponding intermolecular resin acid anhydride by acetic anhydride.

* * * * *